Aug. 5, 1947.  H. A. MULVANY  2,425,114
ELECTRIC SOLDER-APPLYING MACHINE
Filed Aug. 6, 1943  5 Sheets-Sheet 1
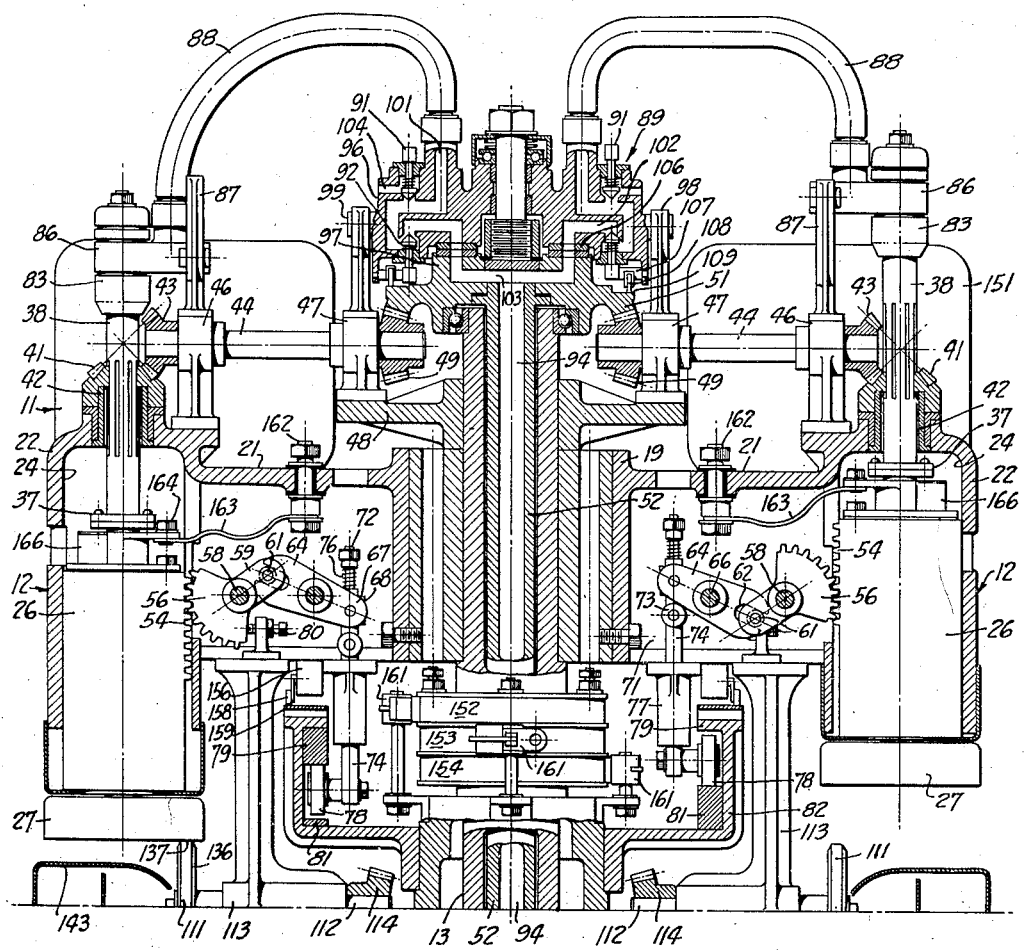
FIG_1A_
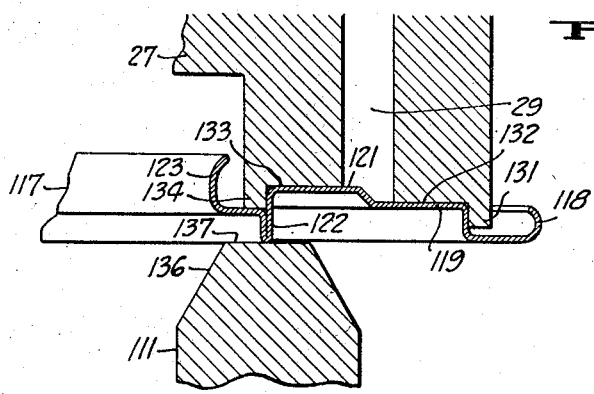
FIG_2_
INVENTOR
Harry A. Mulvany
BY Paul D. Flehr
ATTORNEY Aug. 5, 1947.  H. A. MULVANY  2,425,114
ELECTRIC SOLDER-APPLYING MACHINE
Filed Aug. 6, 1943   5 Sheets-Sheet 2
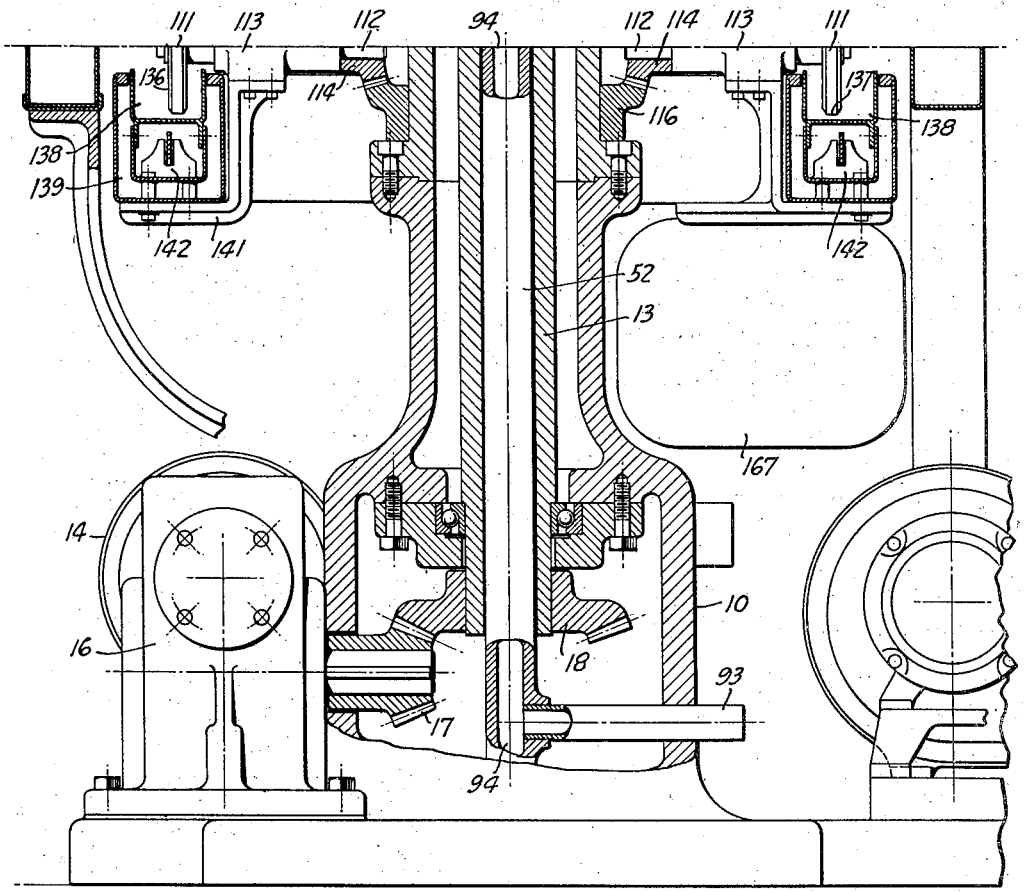
FIG_1B_
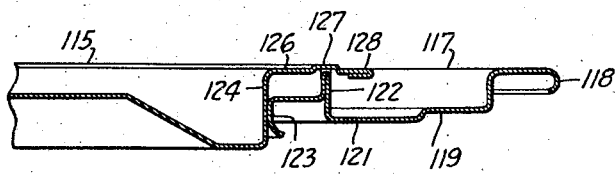
FIG_5_
INVENTOR
Harry A. Mulvany
BY
ATTORNEY

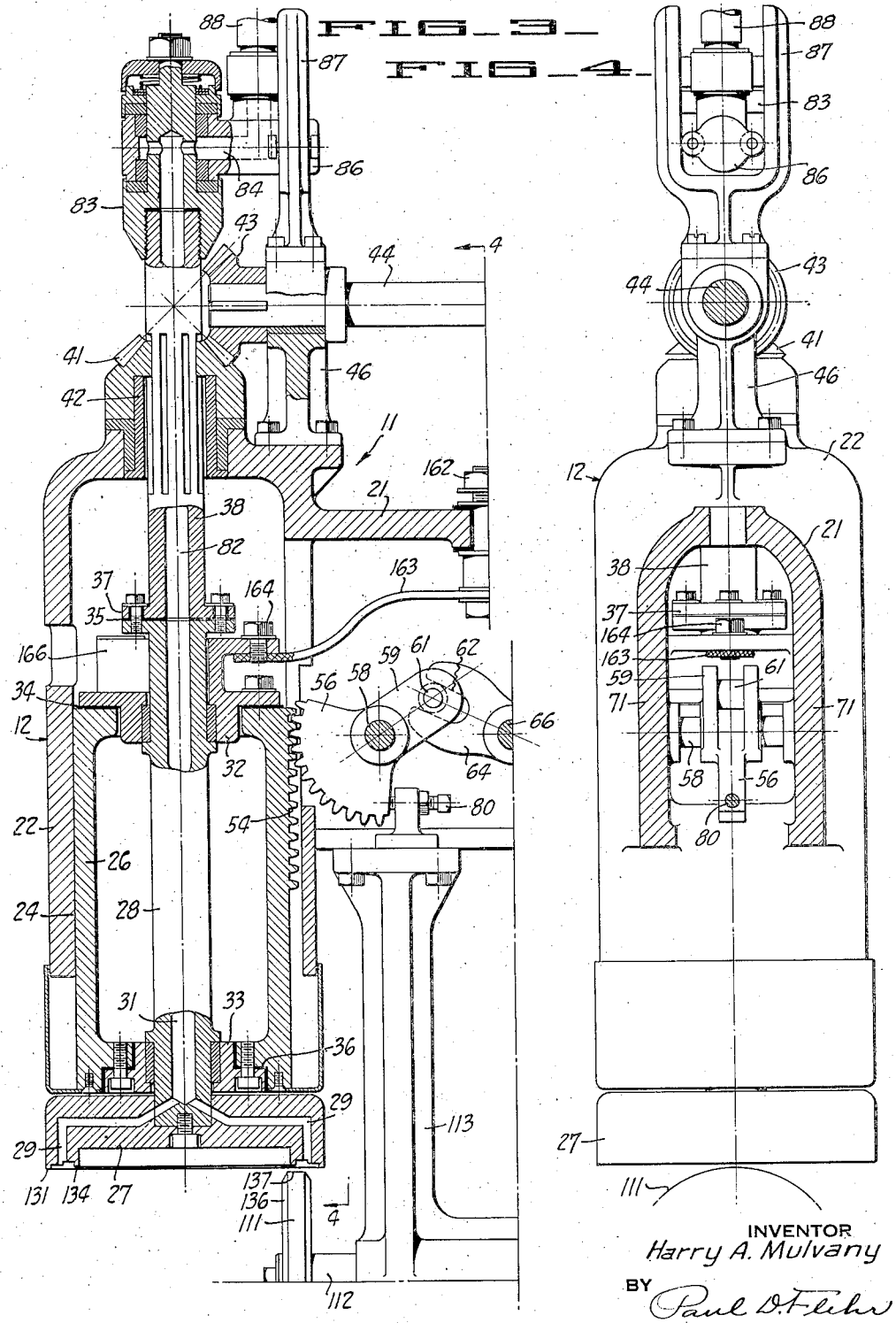

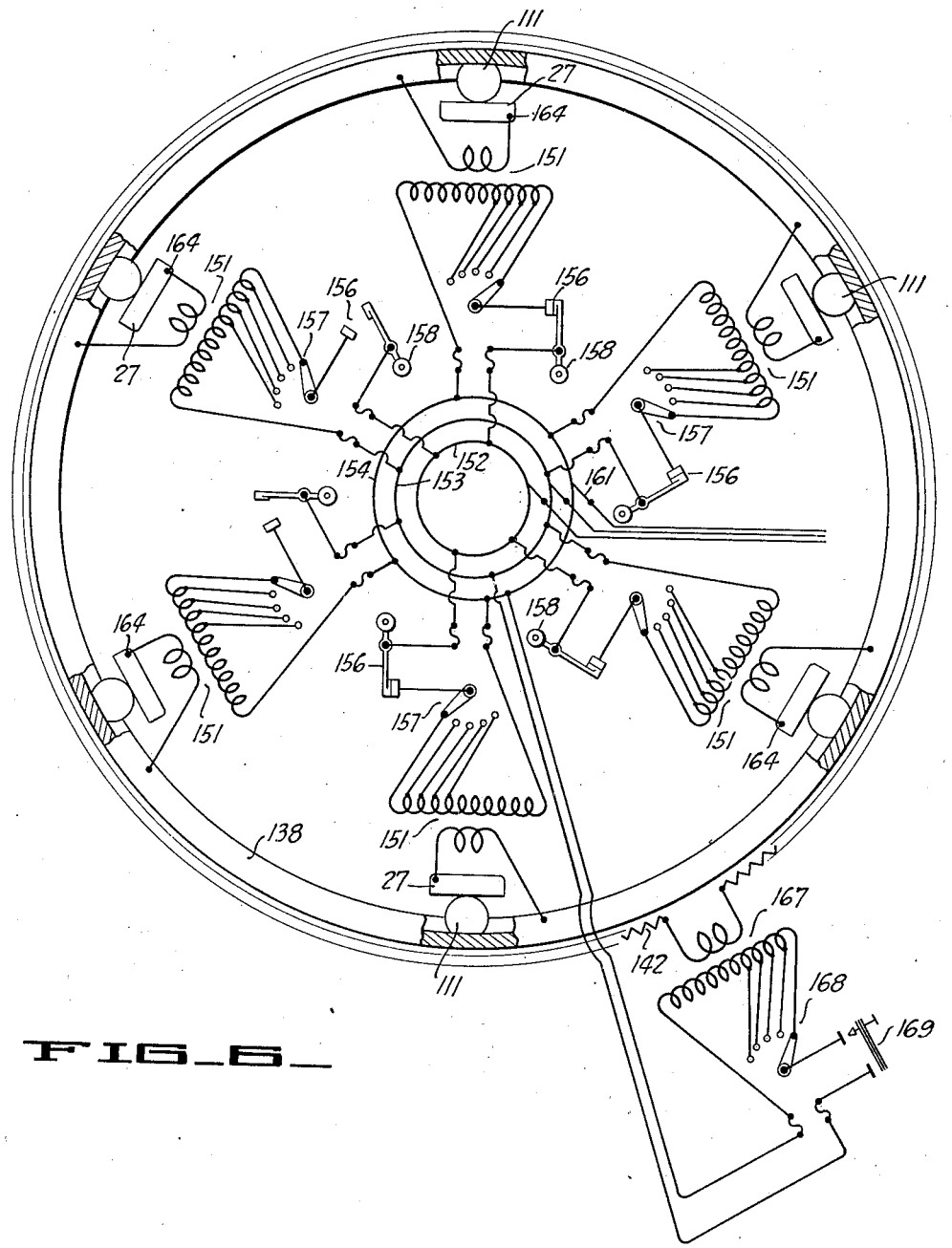

Aug. 5, 1947.  H. A. MULVANY  2,425,114
ELECTRIC SOLDER-APPLYING MACHINE
Filed Aug. 6, 1943  5 Sheets-Sheet 5
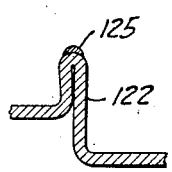
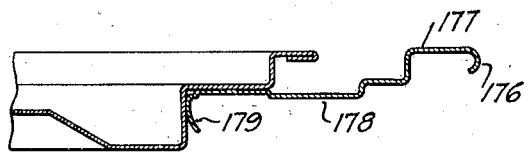
FIG_7_    FIG_8_
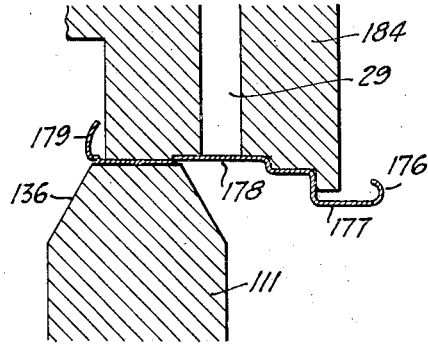
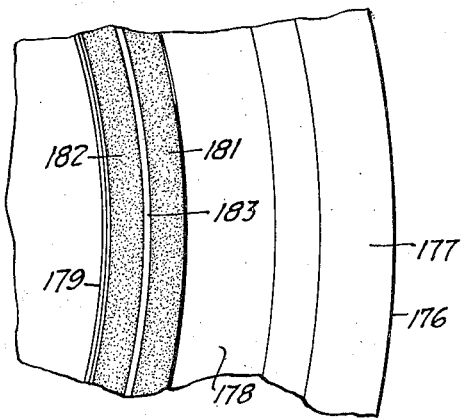
FIG_10_    FIG_9_
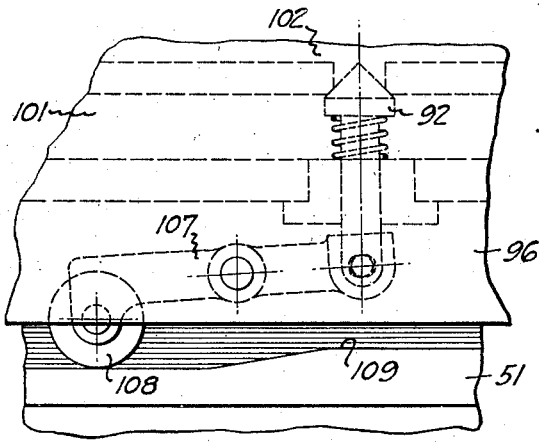
FIG_11_
INVENTOR
Harry A. Mulvany
BY Paul D. Fehr
ATTORNEY Patented Aug. 5, 1947

2,425,114

UNITED STATES PATENT OFFICE 2,425,114

ELECTRIC SOLDER-APPLYING MACHINE

Harry A. Mulvany, Berkeley, Calif., assignor to Hills Bros. Coffee, Inc., San Francisco, Calif., a corporation of California Application August 6, 1943, Serial No. 497,646

1 Claim. (Cl. 219—12)

This invention relates generally to a machine for applying solder to certain objects preparatory to subsequent assembling and final soldering operations. More particularly it relates to a machine particularly adapted for carrying out the soldering operation required for a container top assembly such as described and claimed in co-pending application Serial No. 349,719, filed June 29, 1942.

In the aforesaid co-pending application Serial No. 349,719, there is disclosed a sealed container construction particularly adapted for the marketing of products such as coffee, spices, various preserved foods, paints, and the like. The top of the container is assembled from two sheet metal parts, one being an outer ring, and the other being a cover or closure arranged to frictionally engage the ring. These parts have limited annular areas which are sealed together by solder, but which can be readily broken apart by prying the cover with a common kitchen utensil, such as a spoon. It is an object of the present invention to provide a novel machine for applying a narrow line of solder to one of these metal parts, preparatory to finally soldering the assembly of the two parts in the machine disclosed in my co-pending application Serial No. 497,647, filed simultaneously herewith and entitled "Electric soldering machine."

A further object of the invention is to provide a machine characterized by its ability to apply a relatively narrow deposit of solder at a relatively high speed, without lateral spreading of the solder and with a relatively low solder bath temperature.

A further object of the invention is to provide a machine capable of applying a minimum amount of solder along a predetermined area of a container part.

Another object of the invention is to provide a machine of the above character capable of relatively high capacity.

Further objects of the invention will appear from the following description in which the preferred embodiment has been described in detail in conjunction with the accompanying drawing.

The Figures 1A and 1B, taken together, form a side elevational view in cross-section, showing a machine incorporating the present invention.

Figure 2 is an enlarged cross-sectional detail, showing the manner in which the ring part to which solder is being applied, is retained by the holder, and how an end face of a rib is contacted with the solder applying wheel.

Figure 3 is a side elevational detail, in cross-section and on an enlarged scale, showing one of the operating heads of the machine.

Figure 4 is a view taken along the line 4—4 of Figure 3.

Figure 5 is an enlarged cross-sectional detail, showing a cover and ring assembly of the type formed by use of the present machine, after application of solder to the same.

Figure 6 is a circuit diagram showing electrical connections for various parts of the machine.

Figure 7 is an enlarged sectional detail showing a ring part after solder has been applied.

Figure 8 is a sectional view like Figure 5, but showing another type of ring cover assembly.

Figure 9 is a fragmentary plan view of the ring part shown in Figure 8.

Figure 10 is a view like Figure 2, but showing application of solder to the ring part of Figure 9.

Figure 11 is an enlarged detail showing the cam means for operating the vacuum control valves.

Referring first to Figures 1A and 1B, the machine consists generally of a base 10, serving to support a rotary structure 11, which in turn carries a plurality of circumferentially spaced heads 12. Each head 12 rotates about the central vertical axis of the machine, and operates in conjunction with feed and discharge mechanism, as for example mechanism of the star wheel type. Thus the parts to which solder is to be applied are fed to the machine in position to be picked up and retained by the heads 12, after which the parts pass through solder applying operations and finally reach a discharge position where they are received by a discharge mechanism. The feed and discharge mechanisms have been omitted to avoid needless complication.

The main vertical shaft 13 of the machine is suitably journalled within the base 10 and is connected with the drive means to rotate the same at a constant rate. As shown in Figure 1B, the drive means in this instance consists of an electric motor 14 connected to the speed reducing gearing 16. This gearing drives the bevel gear 17, which in turn engages the bevel gear 18 secured to the lower end of shaft 13. An upper portion of shaft 13 carries the sleeve or hub 19, which in turn forms a mounting for the spider 21. This spider serves to carry the heads 12, together with other operating parts.

Each of the heads 12 (Figures 3 and 4) preferably consists of a casing or shell 22, which is attached to or formed as a part of the general casting which forms the spider 21. A vertical cylindrical bore 24 is formed within the shell 22, and serves to slidably receive the cylindrical plunger 26. At the lower end of the plunger 26 there is a holding or retaining device or chuck 27, which is for the purpose of retaining the part to which solder is to be applied. Device 27 is attached to the lower end of the rotatable shaft 28 which extends upwardly through plunger 26.

The lower face of the device 27 is contoured to fit a particular part as will presently be explained and it is desirable to retain the part during the solder applying operation by suction. For this purpose the device is shown provided with the air ducts 29 leading to an opening or passage 31 in shaft 28.

In order to electrically insulate holding device 27 and shaft 28 from surrounding parts, the shaft is shown journaled within bearing members 32 and 33, which are flanged as shown and screwed or bolted to the opposite ends of the plunger 26. Electrical insulation 34 and 36 is inserted between parts 33 and 32 and the plunger 26, whereby the plunger and the surrounding shell 22 are completely insulated from the shaft.

In order to provide drive means for turning shaft 28 at a constant speed, its upper end has a coupling connection 37 to the lower end of a shaft 38, and this coupling is likewise provided with electrical insulation 35. The extension of shaft 38 above the shell 22 is splined to a bevel gear 41, which in turn is journaled upon the quill 42. Gear 41 engages the bevel gear 43, which in turn is secured to the outer end of a shaft 44. Each of the shafts 44 extends radially from the central axis of the machine, and is carried by the journal brackets 46 and 47. The inner journal brackets 47 are carried by a spider 48, which is attached to the shaft 13 immediately above the hub 19 (Figure 1A). Bevel gears 49 are secured to the inner ends of shaft 44, and all of these gears engage the common bevel gear 51. The latter gear is attached to the upper end of a stationary tubular shaft 52, which extends upwardly through the rotatable shaft 13, and which is attached at its lower end to the machine base (Figure 1B). Thus gear 51 remains stationary when the machine operates to cause the bevel gears 49 to rotate as the machine is in operation, thereby imparting rotation to shafts 38 and 28 through the bevel gears 41 and 43.

In conjunction with the operation of the machine, means is provided for raising and lowering each of the devices 27. Thus the inner side of each plunger 26 (Figure 3) is formed to provide a gear rack 54, the teeth of which engage teeth on a gear segment 56. This segment is rotatably carried by shaft 58 and is provided with an extension arm 59. A pin 61 carried by arm 59 engages within a slot 62, formed in one arm of the rocker 64. This rocker in turn is carried by the shaft 66, and its inner arm 67 is pivotally attached to the sleeve 68. Both the shafts 58 and 66 can be carried by suitable vertical web walls 71 (Figure 4), forming a part of the main spider 21.

In order to operate the rockers 64, the sleeve 68 of each rocker slidably engages a vertically extending rod 72, the lower end of which has a pivotal connection 73 with the upper end of rod 74. A compression spring 76 on rod 72 presses downwardly upon sleeve 68, and urges this sleeve into engagement with a shoulder formed upon the rod 72. Rod 74 is slidably retained by the bearing 77, which in turn is mounted upon the webs 71. The lower end of each rod 74 carries the cam roller 78, which engages between the two cam surfaces 79 and 81. These cam surfaces are carried on the spider 82, which in turn is mounted upon the upper portion of the main base stand. Cam surfaces 79 and 81 are so formed that as the heads 12 rotate about the central axis of the machine, rods 74 are raised and lowered, to rock the segments 56, and thus raise and lower the plungers 26 and their associated holding devices 27. Compression springs 76 permit a certain amount of give in an upward direction, whereby an object carried by the chuck or holding device 27 is yieldably urged against its associated solder applying wheel. It will be noted that each segment 56 is associated with an adjustable stop in the form of a set screw 80, whereby the lowermost position of each holding device 27 can be adjusted.

Reference has been made to the ducts 29 and passage 31 for applying suction or vacuum to the holding devices 27. Passage 31 continues as the passage 82 through the shaft 38, and at the upper end of this shaft 38 there is a fitting 83 whereby passage 82 is placed in continuous communication with a passage 84, in the stationary fitting part 86. Fitting part 86 is retained against rotation by a fork 87, which in turn is mounted upon the adjacent journal bracket 46. Each fitting part 86 is connected to a flexible hose 88, which in turn leads to the valve structure 89 for controlling application of suction.

It will be apparent that a variety of valve structures can be utilized for controlling application of suction. During a solder applying operation suction is applied continuously through the hose 88, and as a particular holder passes from the solder applying operation to the discharge position, the suction is released by disconnecting the particular hose 88 from the source of vacuum, and by venting the hose to the atmosphere. Suction is subsequently applied by reconnecting the hose to the source of vacuum as the head passes through the feed position.

The particular valve structure 89 indicated in Figure 1a consists of an individual vent valve 91 for each hose 88, and a valve 92 for controlling communication between the hose 88 and the source of vacuum. The source of vacuum is shown being applied to a pipe 93 at the bottom of the machine, and which connects to the vertical passage 94 extending upwardly through the stationary tube or shaft 52. The main body part 96 of the valve structure 89 is journaled to the upper end of the extension 97 of the stationary gear part 51. It is caused to rotate together with spider 21, by suitable means such as brackets 98 which are carried by the journal bracket 47, and which engage projecting tabs 99 secured to the body 96. Communication between each hose 88 and the passage 94 of shaft 52, can be traced as follows: The inner end of each hose communicates with duct 101, which when valve 92 is open communicates with duct 102, duct 103 in the part 51, and then passage 94. When valve 92 is closed, and valve 91 opened, duct 101 communicates with the atmosphere through the vent duct 104. A suitable sealed coupling 106 is interposed between the body 96 and the stationary part 51, whereby ducts 102 and 103 are in communication at all times. Valves 91 and 92 are mechanically connected together by means of suitable yoke mechanism or like motion transmitting members, to operate in conjunction, whereby when a valve 92 is closed the corresponding vent valve 91 is opened, and conversely when valve 92 is opened valve 91 is closed. Suitable cam means is indicated for operating these valves automatically, consisting for example of a rocker 107 (Figure 11) and a cam roller 108, engaging the annular cam surface 109 on the stationary gear 51. The cam surfaces are formed to secure operation of the valve in proper timed relationship with movement of the heads about the machine.

Below each of the heads 12 there is a solder applying wheel 11. Each wheel is secured to the outer end of a shaft 112, which in turn extends radially with respect to the main shaft 13 of the machine, and is carried by the journal bracket 113. The inner end of each shaft 112 carries a gear 114, which engages the teeth of a bevel ring gear 116. The latter gear is fixed to the main machine base, as shown in Figure 1B. Thus, when the machine is in operation the gears 114 and 116 impart continuous rotation to the shafts 112, to continuously rotate the solder applying wheels 111.

Previous reference has been made to a particular contouring of the chucks or devices 27, to receive a particular type of ring part of a container top assembly. One type of cover and ring assembly is shown in Figure 5. Briefly both the cover and ring parts 115 and 117 are formed of pressed sheet metal, such as is ordinarily used in the manufacture of so-called tin containers, and which may be either so-called black iron or tin plated. The outer periphery of the ring part 117 has a turned edge 118, for double seaming in accordance with methods known to those skilled in the art to form an end seam with side walls of a container. Concentric annular offsets 119 and 121 lend strength to the ring, and make it possible for the completed assembly to present a substantially planar outer surface. An annular portion of the ring is doubled upon itself to form in effect an annular rib or shoulder 122. Inwardly of this shoulder the remaining metal of the ring forms an inturned collar 123.

The cover part is formed to provide a nearly cylindrical portion 124 which is proportioned to frictionally fit within the collar 123. Also the cover has an inwardly extending flange 126 which is adapted to overlie the shoulder 122. Preferably flange 126 has an annular portion of its area struck up as at 127, in the region of the shoulder 122, and also its outer edge is preferably turned over as at 128 to lend strength. It is to the narrow outer end face of the rib 122 that solder is to be applied to form a ridge 125 of solder (Figure 7), whereby after completing the assembly by application of the cover in the manner shown in Figure 5, it is possible to perform a final soldering operation by use of the means and method disclosed in my co-pending application, supra, filed of even date.

The lower face of the holding device 27 can be contoured as shown in Figure 2, to provide adequate seating surfaces for the ring part 117 (see Figure 2). Thus an annular rib 131 is provided to fit about the offset portion 119. Annular surfaces 132 and 133 are provided to contact the faces of the offset portions 119 and 121. The ducts 29 communicate with the bottom face of the holding device 27 intermediate the surfaces 132 and 133. An inner depending lip 134 fits within the inner edge of the offset portion 133. The solder applying wheel 111 is shown provided with bevelled peripheral edges 136 and an outer peripheral solder applying surface 137. During a solder applying operation the peripheral face 137 contacts the narrow end face of the rib 122, as shown in Figure 2.

Suitable means is provided for continuously maintaining solder upon the peripheral edge portions of the solder applying wheels 111. This means consists of an annular trough 138 (Figure 1B), enclosed within a trough-like housing 139 and carried by the brackets 141. Below the trough 138 there is a suitable electrical heating element 142. The lower portions of all of the solder applying wheels 111 extend within the trough 138 and normally the trough contains a quantity of molten solder to immerse a lower segmental portion of each wheel. Thus the peripheral edge portions of the wheels are maintained "tinned" with solder. A suitable housing or guard 143 (Figure 1A) can be provided to cover the exposed portions of the trough 138.

Figure 6 shows a suitable circuit diagram for making electrical connections to the various heads. Individual transformers 151 are provided for each of the operating heads and these transformers have their primaries connected to the slip rings 152, 153 and 154, in series with the off and on switches 156 and the voltage controlling switches 157. Switches 156 are arranged to be operated by cam rollers 158 which engage a suitable annular cam 159 (Figure 1A) mounted upon the machine. By this means a switch 156 is maintained closed during a soldering operation for the particular head to which the transformer is connected. The slip rings 152, 153, and 154 are illustrated in Figure 1A and are contacted by suitable brushes 161, which in turn make connection with a suitable source of alternating current supply.

In general the transformer secondaries supply voltages considerably lower than the line voltage supplied to their primary windings. One side of each transformer secondary connects with a terminal 162 which in turn connects with a flexible conductor 163. Each conductor 163 in turn connects with a terminal 164 which is in direct contact with its associated shaft 28, through a suitable brush structure 166. The other side of each transformer secondary connects to the solder containing trough 138.

In order to maintain the solder at a substantially constant temperature an additional stepdown transformer 167 is provided, and the secondary of this transformer connects to a heating element 142. The primary of this transformer is shown connected to two of the aforesaid slip rings, in series with a suitable voltage adjusting switch 168 and an automatic thermostat 169.

Operation of the machine described above can be reviewed as follows: As previously explained suitable mechanism, as for example of the star wheel type, supplies ring parts to the machine in synchronism with movement of the operating heads. Either in conjunction with the feed means or independently, suitable means is provided for application of a flux to the surfaces which are to receive the solder, namely the end face of the rib 122. At a definite feed position a ring is presented to the lower end of an operating head and is lifted into seating position with an associated chuck or holding device 27, as vacuum is applied. Immediately thereafter a soldering operation commences in which the holding device 27 is lowered to bring the end face of the rib 122 into engagement with the top peripheral portion 137 of the solder applying wheel 111. The mechanism for lowering the holding device 27 has been previously described and includes particularly the gear rack 54, gear segment 56, rocker 64, cam roller 76 and the cams 79 and 81. At the time contact is established between the lower face of the rib and the periphery of the solder applying wheel 111, both the ring part and the solder applying wheel are in rotation, with their contacting surfaces moving in the same general direction, and therefore there is rolling movement of the solder applying wheel with respect to the rib 122. Immediately prior to establishing this engagement between the rib 122 and the solder applying wheel the associated transformer 151 is connected to its source of current by the closing of its associated switch 156. Thus electric current, as for example from 400 to 450 amperes, flows through the relatively small area of contact between the rib and the solder applying wheel to cause a substantial amount of localized heating. While the amount of localized heating may vary in accordance with the type of solder employed and in accordance with the type of objects to which the solder is being applied, good results in the particular instance described have been secured where the solder within the trough 139 has a temperature of the order of 625° F. and is heated at the point of contact with the rib 122 to a temperature of approximately 700° F. For ordinary solder consisting of 50% lead, 50% tin, such an elevated temperature is well below vaporization point. The solder applying wheel in this instance was about 4 inches in diameter.

As the rolling engagement proceeds between the solder applying wheel and the rib 122 a narrow line of solder is deposited upon the end face of the rib, and although a substantial amount of localized heating occurs in the small area of contact between the wheel and the rib, the solder immediately following this area hardens instantaneously and there is no tendency for the solder to spread laterally over the adjacent surfaces of the rib, even though these surfaces may be plated with tin and are ideally suited for spreading of solder. The solder applying operation is completed when the ring part is rotated slightly more than one revolution about its axis. The holding device 27 is then elevated to retract the ring part from the solder applying wheel and thereafter discharge position is reached in which the vacuum applied is vented in the manner previously described, and the ring part drops into engagement with the discharge mechanism.

A characteristic features of the machine and method described is that the application of solder occurs at relatively high speed. Thus using the type of solder mentioned above at temperatures of the order of from 600 to 650° F. and with application of current acoss the small area of contact at values of the order of from 400 to 450 amperes, the speed of solder application is made to be of the order of from 50 to 75 feet per minute. This high rate of relative movement makes for high capacity and would be difficult if not impossible without application of current to the small area of contact between the solder applying wheel and the rib. In general it can be explained that the combination of high speed of movement and application of current to the area of contact between the solder applying wheel and the rib, makes it possible to prevent spreading of the solder and thus deposit the solder in the form of a narrow line or ridge 125 (Fig. 7) which has a width not greater than the area of solder contact with the wheel. Application of solder in this fashion contributes to the desired type of soldered connection between ring part and the cover part for the completed assembly shown in Figure 5. As previously explained however, the final soldering operation after the ring and cover parts are assembled together can be carried out by the machine and method disclosed and claimed in my co-pending application filed simultaneously herewith. The finished assembly forms a gas tight seal which can be readily broken to remove the cover by inserting a common utensil, such as a spoon, beneath the cover edge 128, and then prying upwardly. The breakage of the seal does not mutilate the cover or ring, and therefore after the cover has been removed in this fashion, it can be returned into frictional engagement with the ring and thus effect an appropriate seal.

My machine and method can also be used for applying solder to a ring part made as shown in Figures 8 and 9. In this instance, the ring part includes the outer turned edge 176 for making a double seam with side walls, the flat portion 177, the inset flat portion 178, and the down turned portion 179 corresponding to portion 123 of Fig. 5. In the manufacture of this ring part the outer face of portion 178 is lacquered by lithographing over two concentric areas 181, 182 which are separated by the narrow or line-like area 183. After application of a suitable flux this ring part is introduced into the machine as shown in Figure 10, with the lower end of holding device 184 modified as to contour to receive the same.

Operation of the machine as previously described applies a narrow line of solder to the area 183. The width of the solder applied is limited in this instance by the lithographing, while the high speed of application and use of localized heating insures uniform solder application and a line of solder of substantial depth.

After preparing a ring part in the manner described above it can be assembled with a cover part (Fig. 8) in the same manner as described with reference to Figure 5.

I claim:

In a soldering machine of the character described, supporting means, a holding device carried by the supporting means, means for rotating the holding device about a vertical axis, the lower face of the holding device being shaped to receive a sheet metal object having an annular portion to which solder is to be applied to form a narrow layer of solder on the same, means for retaining an object in said holding device, a soldering wheel-electrode carried by the supporting means below the holding device, means mounting said wheel for rotation about a generally horizontal axis extending radially to the vertical axis of the holding device, said wheel being arranged for peripheral contact with said annular portion as said holding device is being rotated, means for moving the holding device towards and away from the solder applying wheel, in a vertical direction, and means for applying electrical current to the holding device and to the solder applying wheel, whereby electric current is caused to pass through the aforesaid peripheral contact between the wheel and said annular portion.

HARRY A. MULVANY.

REFERENCES CITED

The following references are of record in the file of this patent:

UNITED STATES PATENTS

| Number | Name | Date |
| --- | --- | --- |
| 1,141,517 | Andrews | June 1, 1915 |
| 1,743,519 | Bardet et al. | Jan. 14, 1930 |
| 1,542,664 | Brenzinger | June 16, 1925 |
| 1,876,821 | Dugan | Sept. 13, 1932 |